United States Patent [19]

Pytlik et al.

[11] Patent Number: 5,388,255
[45] Date of Patent: Feb. 7, 1995

[54] SYSTEM FOR UPDATING LOCAL VIEWS FROM A GLOBAL DATABASE USING TIME STAMPS TO DETERMINE WHEN A CHANGE HAS OCCURRED

[75] Inventors: Bogdan Pytlik, Lowell; Abigail L. O'Hara, Andover; Arthur R. LaValle, Chelmsford, all of Mass.

[73] Assignee: Wang Laboratories, Inc., Lowell, Mass.

[21] Appl. No.: 810,245

[22] Filed: Dec. 19, 1991

[51] Int. Cl.⁶ .................. G06F 15/40; G06F 15/419
[52] U.S. Cl. .................. 395/600; 364/282.4; 364/974; 364/974.7; 364/DIG. 1
[58] Field of Search .......................... 395/600

[56] References Cited

U.S. PATENT DOCUMENTS

| | | | |
|---|---|---|---|
| 4,769,772 | 9/1988 | Dwyer | 364/300 |
| 4,855,906 | 8/1989 | Burke | 395/700 |
| 4,897,781 | 1/1990 | Chang et al. | 364/200 |
| 5,113,519 | 5/1992 | Johnson et al. | 395/600 |
| 5,181,162 | 1/1993 | Smith et al. | 364/419 |
| 5,226,117 | 7/1993 | Miklos | 395/157 |

FOREIGN PATENT DOCUMENTS

| | | |
|---|---|---|
| 0320266 | 6/1989 | European Pat. Off. . |
| 1521600 | 8/1978 | United Kingdom . |
| 2172130 | 9/1986 | United Kingdom . |

Primary Examiner—Thomas C. Lee
Assistant Examiner—Jack M. Choules
Attorney, Agent, or Firm—Kenneth L. Milik

[57] ABSTRACT

An Open Office Directory System stores information in the form of entries in a global database and views in a local database along with a time stamp indicating the date the view was originally written or last modified. Subsets of the selected global entries are stored as views in a local database with the time stamp of the last generation or modification of that view in the global database. The entries in the global database are queried periodically by the local site to compare the time stamps of the local views with the respective entries in the global database. The result of a non-comparison is to update the local view including its time stamp to agree with the global database entry(s).

2 Claims, 8 Drawing Sheets

SYSTEM FOR UPDATING LOCAL VIEWS FROM A GLOBAL DATABASE USING TIME STAMPS TO DETERMINE WHEN A CHANGE HAS OCCURRED

BACKGROUND OF THE INVENTION

1. Scope of the Invention

This invention relates to Data Processing Systems, and more specifically to the ability of providing selected and automatically updated relational database views.

2. Description of the Prior Art

In the fall of 1988 two of the worlds foremost standards organizations, the Consultative Committee on Internal Telephone and Telegraph (CCITT) and the International Standards Organization (ISO), set forth a standard for global Directory Service.

Even though the two organizations collaborated on setting this standard, they each maintain their own name for it. To the CCITT it is knows as CCITT recommendation X.500, whereas for the ISO it is known as International Standard 9594. To simplify the disparate naming for the virtually identical standard, most people refer to it as the Open Systems Interconnection Directory Service—or the OSI Directory.

The architecture of this OSI Directory can be described as a group of cooperating server processes which collectively hold a single global information base about objects of interest and provide read and write access to this information through a query based interface. In essence, the OSI Directory is an iteration of a Distributed Data Base which exhibits some very specific characteristics.

Four characteristics of the OSI Directory which place some constraints on Directory use are:

- Access to the Directory Information is through an interactive query/response mechanism.
- The scope of distribution for the OSI Directory is global in nature.
- The information held about objects tends to be long lived in nature and is thus rarely changed.
- All the information for a particular object of interest is maintained in a single Directory entry at only one of the cooperating servers.

Because of the access mechanism used and the global nature of the Directory Information base, any service request could be distributed across a number of widely separated but cooperating Directory servers. And real performance constraints can arise when the Directory is used in a local manner. The effect is that any Directory Operation which is targeted to gather information from a number of widely distributed Directory entries can be an extremely time consuming and cumbersome operation to handle in an on-line fashion.

One popular method of eliminating the burden of such lengthy request times is to provide an adjunct process which issues the global queries in a scheduled but off-line fashion. The results are then subsequently stored in a non-volatile cache, typically a local file, and are available for quick local access by the end service consumers. Given the long lived and stable characteristic of the information, the use of a scheduled off-line caching method is an appropriate approach.

The OSI Directory was intended to provide service to a wide range of consumers, each with a special interest. Any particular Directory Service consumer may only be interested in a subset of the total information stored in a particular entry or group of entries.

The single entry characteristic, described above, creates a need for a querying ability which only retrieves selected information. The OSI Directory, through options provided in its query operations (Read & Search) does in fact fulfill this selected information requirement.

As further pertinent background information one must consider the concepts of traditional relational databases. Many traditional relational databases are modelled in terms of tables, columns and rows. And if one were to make an analogy of the traditional relational database model to the OSI Directory Information Base model the following correlations would be true.

A database table, more appropriately known as a relation, corresponds to a set of one or more instances of Directory entries all of the same Object Class.

A database column, more appropriately known as an attribute, exactly corresponds to a Directory entry attribute.

Finally, a database row, more appropriately known as a tuple, corresponds to one instance of a Directory entry.

A further refinement of relational databases concerns the concept of a database views. Although there is a large body of work published on this particular subject, one such work "Distributed Databases Principals & Systems", by Stefano Ceri and Giuseppe Pelagatti, McGraw-Hill, 1984, pp. 330–332, gives the following classic definition of database views as provided through the industry standard SQL language.

"In SQL/DS, views are defined as the result of an SQL select statement, producing a result relation from one or more operand relations. The result relation gives to the user a new "view" of the database (or external schema in the ANSI-SPARC terminology), which is built through the standard query language."

To paraphrase Ceri and Pelagatti, a view can be likened to a new table formed from a selected subset of other tables. A similar concept can be achieved with the OSI Directory. By using existing OSI Directory query operations in a fashion which corresponds to an SQL select, one can create a new set of related entries from an existing set(s). This new set of selected entries corresponds to a relational database view.

OBJECTS OF THE INVENTION

Accordingly, it is an object of the invention to remove the burden of rather lengthy global Directory queries from the end directory service consumer.

It is also the object of this invention to present the cached results, in a form which corresponds to selected relational database views.

SUMMARY OF THE INVENTION

An Open Office Product Architecture of an Open System includes a global database which stores information in the form of entries for an entire organization. The organization may be organized in divisions. Each division may be organized in operations. Each operation may include a number of organizations. An entry for an organization may include an object class, in this case, people. Therefore the entry could include an employee name and number, an employee job title, an E-mail address, an organization identification and a time stamp. The time stamp includes the date and time the entry was made or last modified.

The entries which apply to a particular division or operation are stored locally. The information in each local entry may be a selected subset of the entry stored in the global database, but it will include the time stamp read from the global database the last time the global database was queried for that entry.

Each entry (view) is configured by the Systems Administrator and is called upon periodically, typically once an hour, to check if there are any changes to the global database that have an impact on, and require an update to the local views.

Scheduling information controls when the application that builds and updates the views comes up and runs.

The update process is controlled by storing a pair of time stamp values, or time frame, which define a window in time from which completed update transactions are to be extracted, and thereafter periodically checking the global database for further changes which have occurred during subsequent and later windows in time. Thus only the changed entries are retrieved and updated in the views.

Also provided are the selection criteria and predicates for reading selected attributes from an entry or a number of entries stored in the global database.

DESCRIPTION OF THE PREFERRED EMBODIMENT

Figure 1:
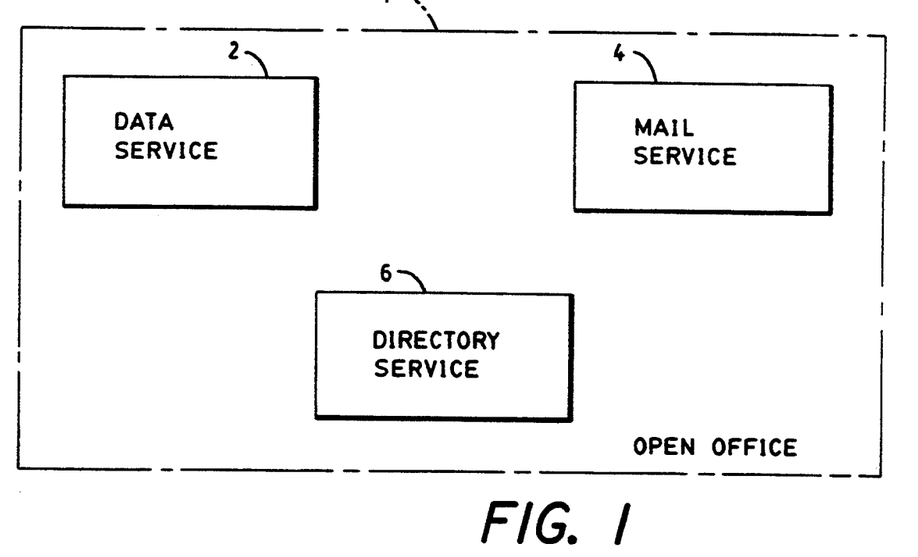
FIG. 1 shows a block diagram of an Open Office Product Architecture of an Open Systems.

FIG. 1 shows a block diagram of an Open Office Product Architecture of an Open Systems offering of a UNIX iteration of E-mail. An Open Office system 1 includes three service components, a Data Service 2, a Mail Service 4 and a Directory Service 6.

Data service 2 retrieves work flow packages, calendar scheduling packages and mail data. Mail Service 4 is the local and remote mail handling service which is based on X.400. The Directory Service 6 is used by both the Data Service 2 and Mail Service 4 to do name and address mapping.

As an example, the Data Service 2 would query the Directory Service 6 for the name of an office data service and the name of an office service user. The Mail Service 4 would obtain mail addressing information including a list of possible names if the user was not sure of the correct spelling of the name.

Figure 2:
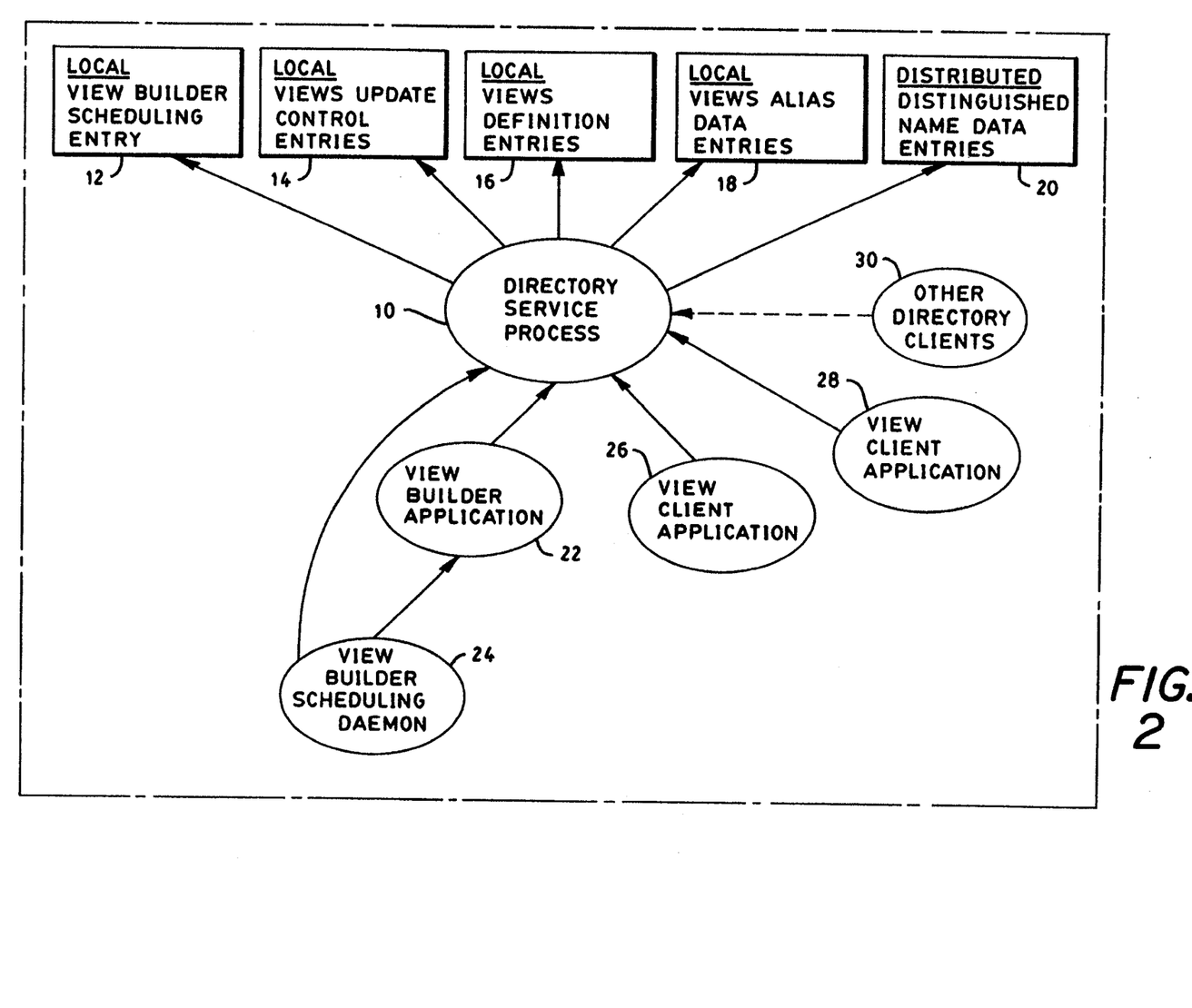
FIG. 2 shows a block diagram of the Directory Service.

FIG. 2 shows a block diagram of the Directory Service 6 which includes a View Builder Scheduling Entry 12, Views Update Control Entries 14, Views Definition Entries 16 and Views Alias Data Entries 18 which are all stored in a local subdirectory, and Distinguished Name Data Entries (Database) 20 which are part of the global distributed directory date base.

Database 20 is the global directory database, and although to the local directory user a virtual unified view is presented, the actual physical global allocation of the data is hidden and only known to the internal directory service components.

A view is a selected subset of an entry stored in Database 20. View Builder 12 contains scheduling information which controls when the application that builds and updates the views comes up and runs. This entry is configured by the Systems Administrator and is called upon periodically, typically once an hour, to check if there are any changes to Database 20 that have an impact on, and require an update to the local views. Every entry in the Database 20 includes the date and time the entry was made, or last modified, and is in the form of a time stamp.

Views Update 14 controls the update process by storing the time stamp of the last update scan, and thereafter periodically checks the Database 20 via View Builder 12 for changes which have occurred after the time of the last update scan. Thus only the changed entries are retrieved and updated in the views.

Views Definition 16 provides the selection criteria and predicates for reading selected attributes from an entry or a number of entries stored in Database 20. The attributes could include job description, phone number, organization, and the like.

Views Alias Data Entry 18 stores the local entries which are received from Database 20 and include the selected attributes.

Directory Server Process 10 is a commercially available X.500 server software program.

The View Builder Application 22, when run, reads the data structure of Views Definition 16 to determine how to formulate the operation to search for changed entries; and uses the control structures which it updates after it does the read to precisely specify the search operation in Database 20 for time stamps later than the time stamps stored in Views Update 14. View Builder 22 then updates the local database entries in Data Entries 18.

View Client Applications 26 and 28 are end user applications that use the entries in Data Entries 18 or Database 20. As an example, Application 26 could be a misspelled name finder, and Application 28 could correct misspelled addresses, or verify zip codes.

Other Directory Clients 30 may also be connected to Server 10.

Figure 3:
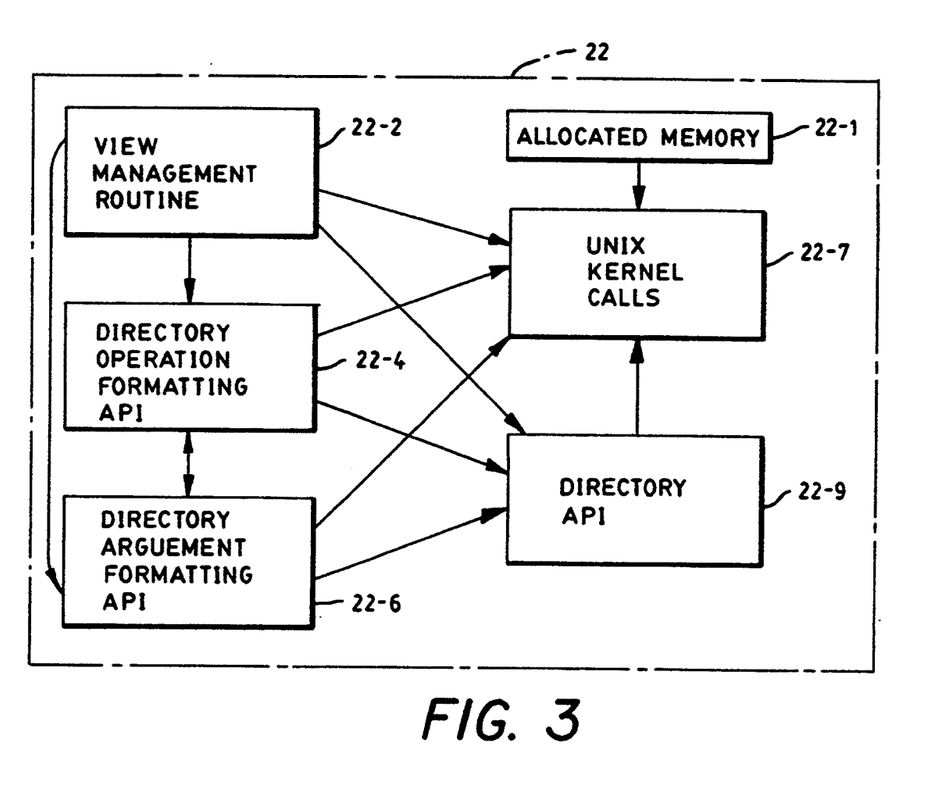
FIG. 3 presents a Functional Component design illustration of the View Builder application.

FIG. 3 presents a Functional Component design illustration of the View Builder application. The essence of this application is the View management Routine 22-2 which is described in further detail in FIG. 4. In order for the View Management routine 22-2 to perform its task it relies on and uses the services of; A Unix Kernel calls 22-7 for memory management of Allocated Memory 22-1, an X.500 Directory API 22-9 for Directory query & modify operations, a Directory Operation Formatting API 22-4, and a Directory Argument Formatting API 22-6.

The View Management Routine 22-2 functional component controls the order of processing when scanning the global directory for changed entries; similarly it controls the order of processing when the local views are updated to reflect these changes. It makes use of all the other functional components comprising the View Builder Application.

Directory Operation Formatting API 22-4 is called directly by the View Management Routine 22-2 formatting and executing a Directory operation on its behalf.

Directory Argument Formatting API 22-6 is called directly by Directory Operation Formatting API 22-4 in support of the Directory Operation Formatting process, this is the indirect result of the call made to Directory Operation Formatting API 22-4 by the View Management Routine 22-2.

Directory API 22-9 are ultimately called by Directory Operation Formatting API 22-4 on behalf of the View Management Routine 22-2. These API's directly access the Directory Server.

Unix Kernel calls 22-7 is called directly and indirectly by View Management Routine 22-2, Directory Operation Formatting API 22-4, and Directory Argument Formatting API 22-6 for standard operating system service functions.

The interaction of all these functional components comprises the View builder application.

Figure 4:
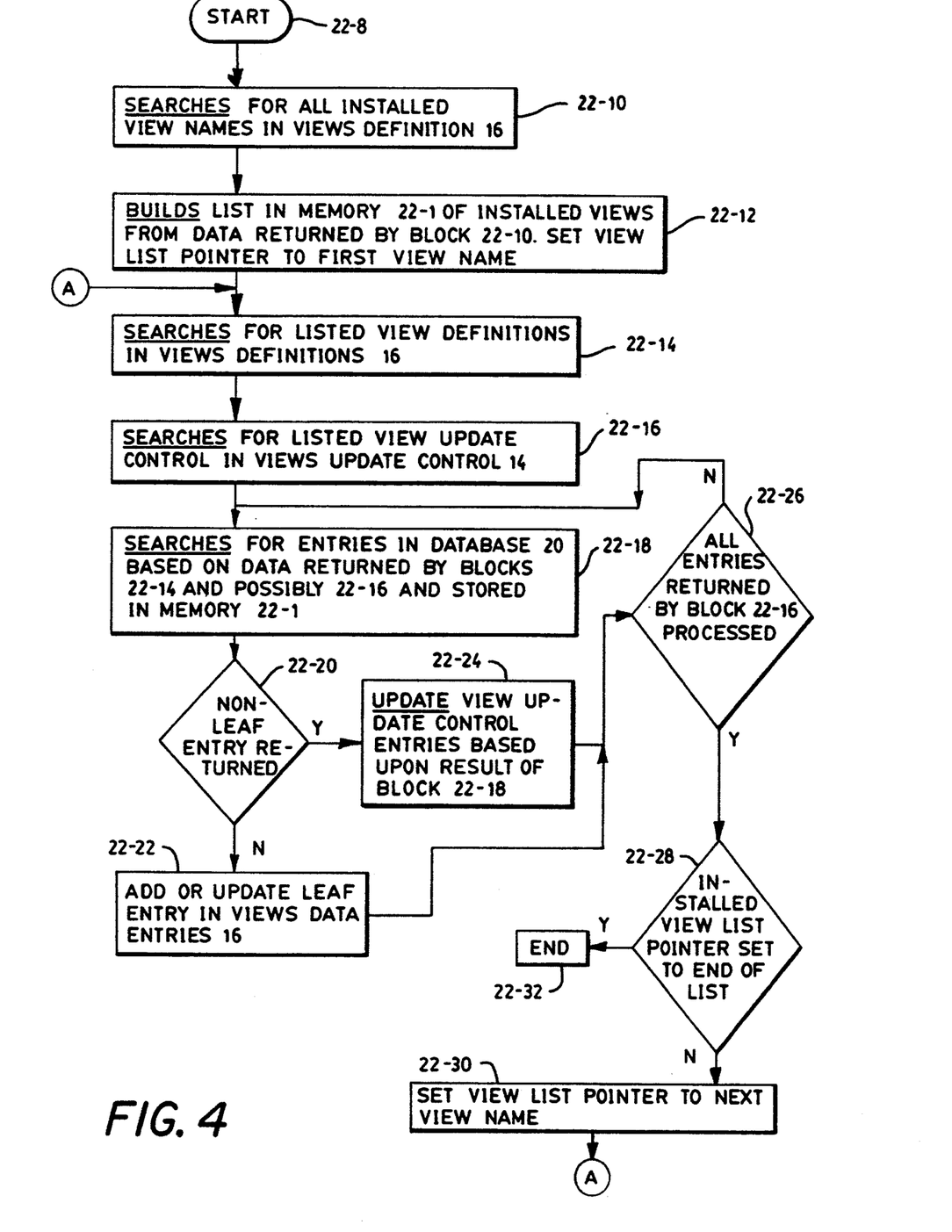
FIG. 4 is a block diagram showing the operation of the View Builder Application

FIG. 4 is a block diagram showing the operation of the View Builder Application 22 of FIG. 2 which reads the data structure of Views Definition 16 to determine how to formulate the operation to search for changed entries. As will be described in further detail in the following and with reference to the following FIGS. 6A, 6B, 6C and 6D and accompanying text, View Builder 22 then uses the control structures which it updates after it does the read to precisely specify the search operation in Database 20 for time stamps later than the time stamps stored in Views Update 14. View Builder 22 then updates the local database entries in Data Entries 18.

Block 22-8 starts the search and update operations.

Block 22-10 searches Views Definition 16 for the names of all installed Views. Then block 22-12 builds a List in memory 22-1 of all the installed view names and sets a pointer to the first entry in the List.

Block 22-14 reads a listed by view name in Views Definition 16 of FIG. 2 for the selected attributes, the predicate, whether a time stamp is present and the name of a parent entry in Database 20. The parent entry name establishes a downward starting point for querying into the data tree in Database 20 for all subordinate children entries.

Block 22-16 reads Views control 14 for the latest time stamp value for the entry.

Block 22-18 searches Database 20 for the entries defined by the search in blocks 22-14 and Directory Argument Formatting API 22-16.

Decision block 22-20 determines if the entry satisfying the criteria and returned by block 22-18 is to be updated to Views Control 14, if so then Block 22-24 updates the entry in Views Control 14. Then decision block 22-26 may call block 22-18 to start the search for the next entry, or call block 22-28 to check for more View Names in the List. The entries are either leaf entries or non-leaf entries. If decision block 22-20 determined the entry returned by 22-18 was not a non-leaf then a leaf was found. Found leaf entries satisfying all of the criteria and are added or updated in Views Data Entry 18 in block 22-22.

Then decision block 22-26 may repeat the loop to block 22-18 until all of the leaf entries are stored in Views Data Entry 18, then Block 22-28 is invoked to determine if all View Names in the list have been processed. If more names are in the View Name List the list pointer is moved to the next entry by block 22-30, if not the process ends at 22-32.

Figure 5:
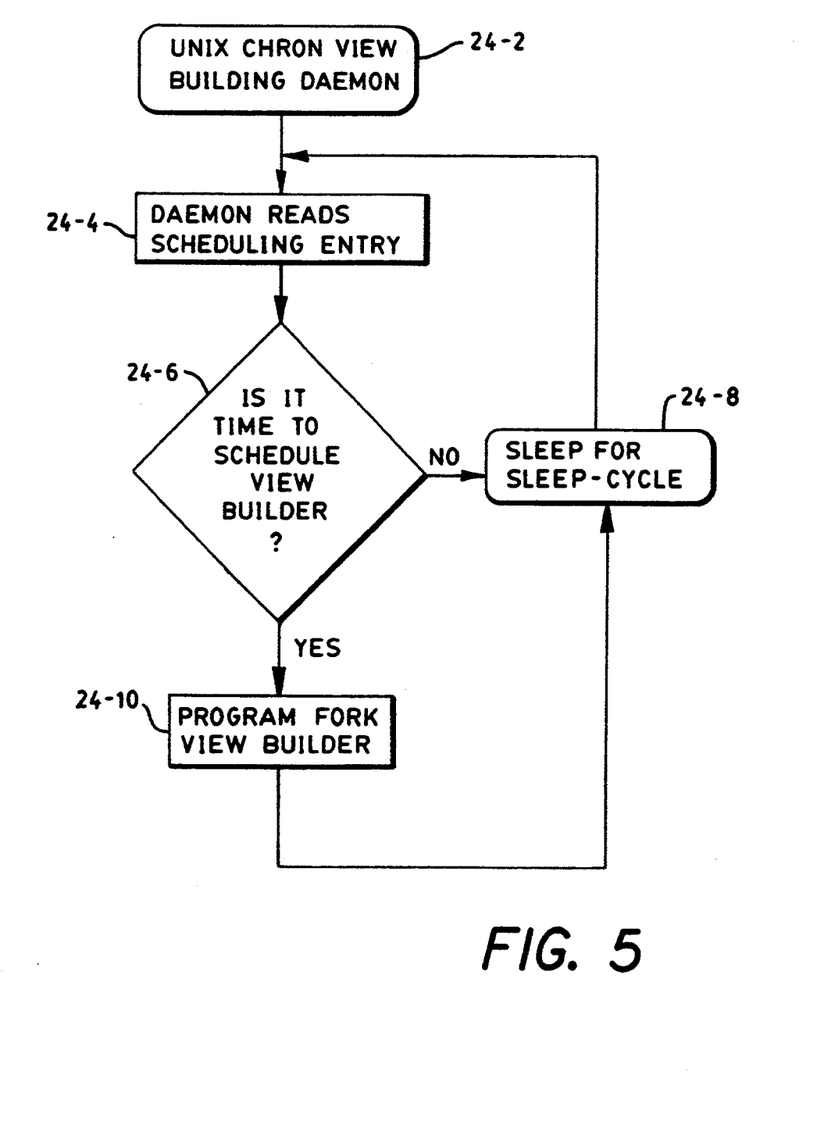
FIG. 5 is a block diagram of the View Builder Scheduling Daemon.

Referring to FIG. 5, View Builder Scheduling Daemon 24, when requested by the Unix kernel time scheduling service (Chron) 24-2, runs on the UNIX system and does a Database 20 read of View Builder Scheduling Entry 12, in block 24-4. Decision block 24-6, using the information it retrieved from View Builder 12, compares the elapsed time since last running and, if appropriate, either schedules (fork) 24-10 the View Builder Application 22, or suspends it at block 24-8. If and when the View Builder Application 22 runs and completes its task, control is returned back in line at block 24-8 at which point the View Builder Scheduling Daemon 24 sleeps.

Figure 6A:
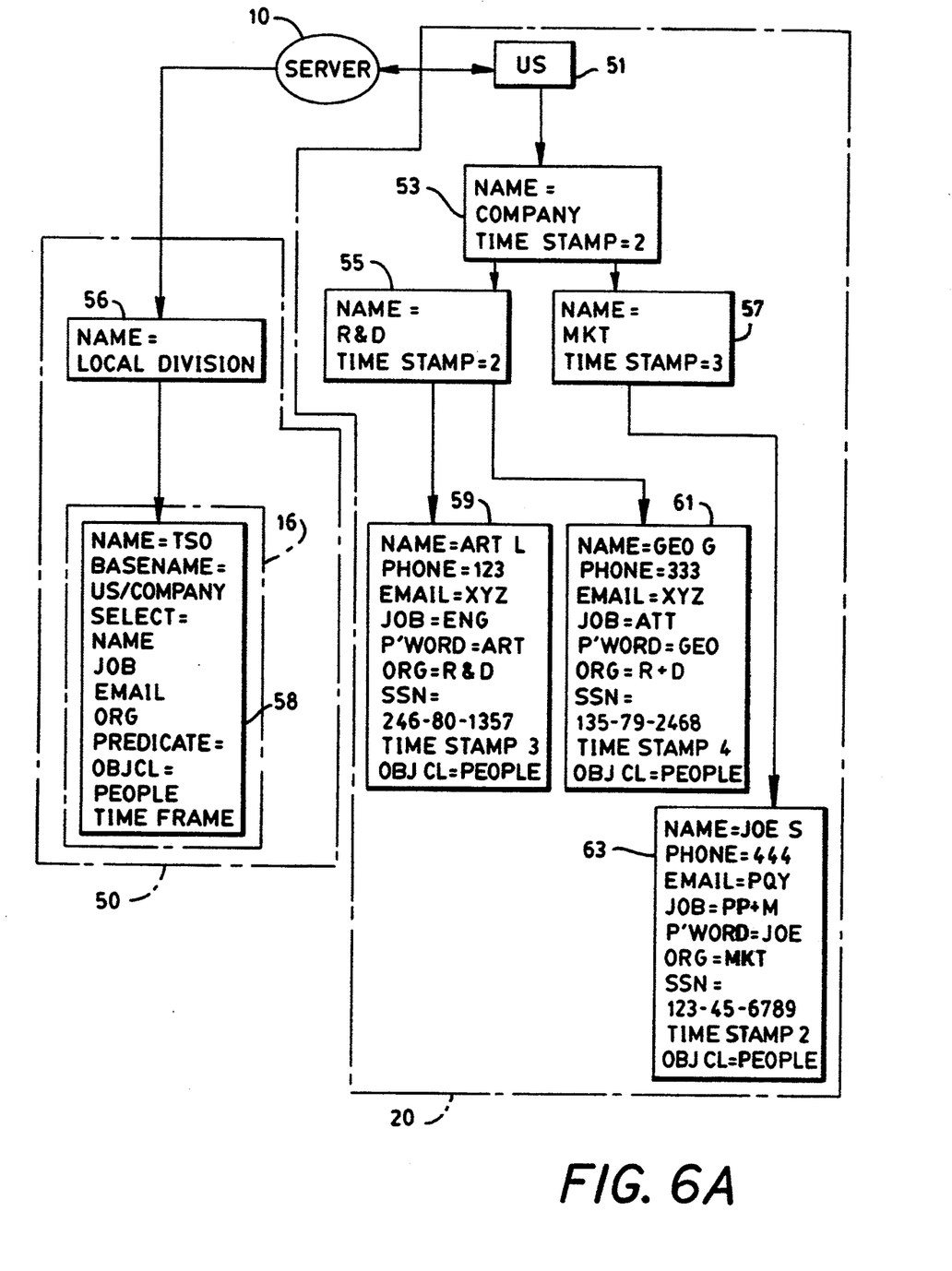
FIGS. 6A, 6B, 6C and 6D show the iterations to develop the local views.

FIGS. 6A, 6B, 6C and 6D show, in a typical example, the iterations of FIG. 4 to develop the local views. FIG. 6A shows the attributes in the local views and the information in the Database 20 immediately after installation.

The Database 20 stores a number of trees including a tree headed by a US tree 51 which includes a Company entry 53 which has, as an example, a time stamp 2. Tree 51 includes a non-leaf Research & Development (R & D) entry 55 with a time stamp 2, and a non-leaf Marketing (Mkt) entry 57 with a time stamp 3. Under R & D 55 are two leaf entries, Art L 59 with a time stamp 003 and Geo G 61 with a time stamp 004. Under Mkt 63 is a leaf entry for Joe S with a time stamp 002.

A number of attributes are shown for each entry. A local tree 50 is subordinate to US entry 51 and is accessed through server 10 at Local Service Name 56. Then under control of View Management routine 22-2, Directory Formatting Operation 22-4 and the Directory Argument Formatting API 22-6 of FIG. 3, Block 22-10, FIG. 4, searches Views Definition 16 for all installed view names. Block 22-12 builds a list of all installed view names in memory 22-1. Block 22-14 retrieves for a named view; the starting point of where to search,—i.e. Base Name=US/COMPANY; the definition of the selected attributes,—i.e. name, job title, E-mail number and organization; the predicate,—i.e. object class=people and time frame=present as shown in block 58.

Block 22-16 searches for any view update control entries, if this is the first pass through none will be found as creation of this type of entry is the result of the later operation performed by block 22-24.

Figure 6B:
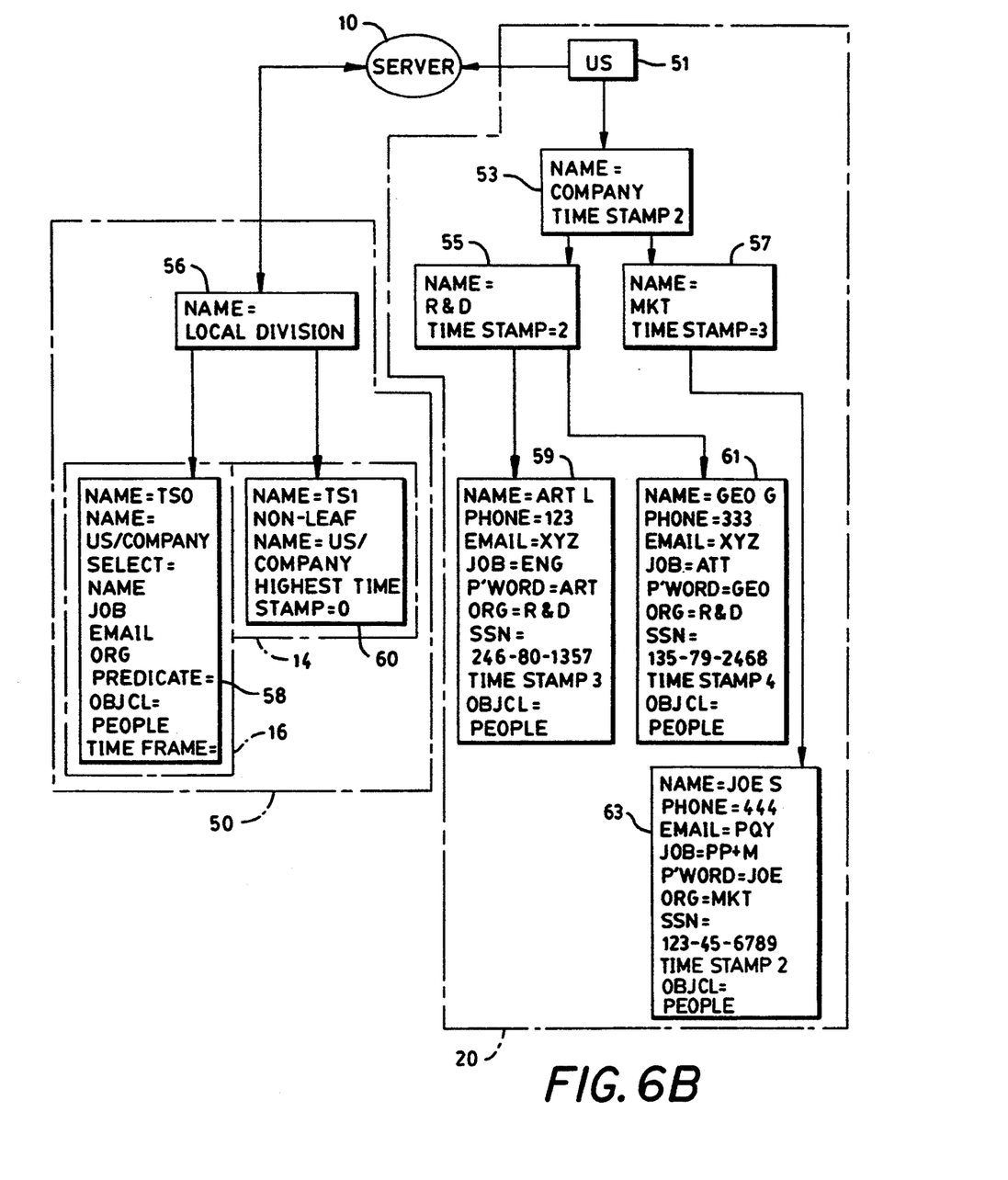

If this not the first pass then Views Control entry 14 is returned from block 60, identified as time 1 (T1) which describes the tree 51 and Company 53 identifiers in Database 20, and a highest time stamp 0. This is illustrated in FIG. 6B which shows local tree 50 after pass 1.

Figure 6C:
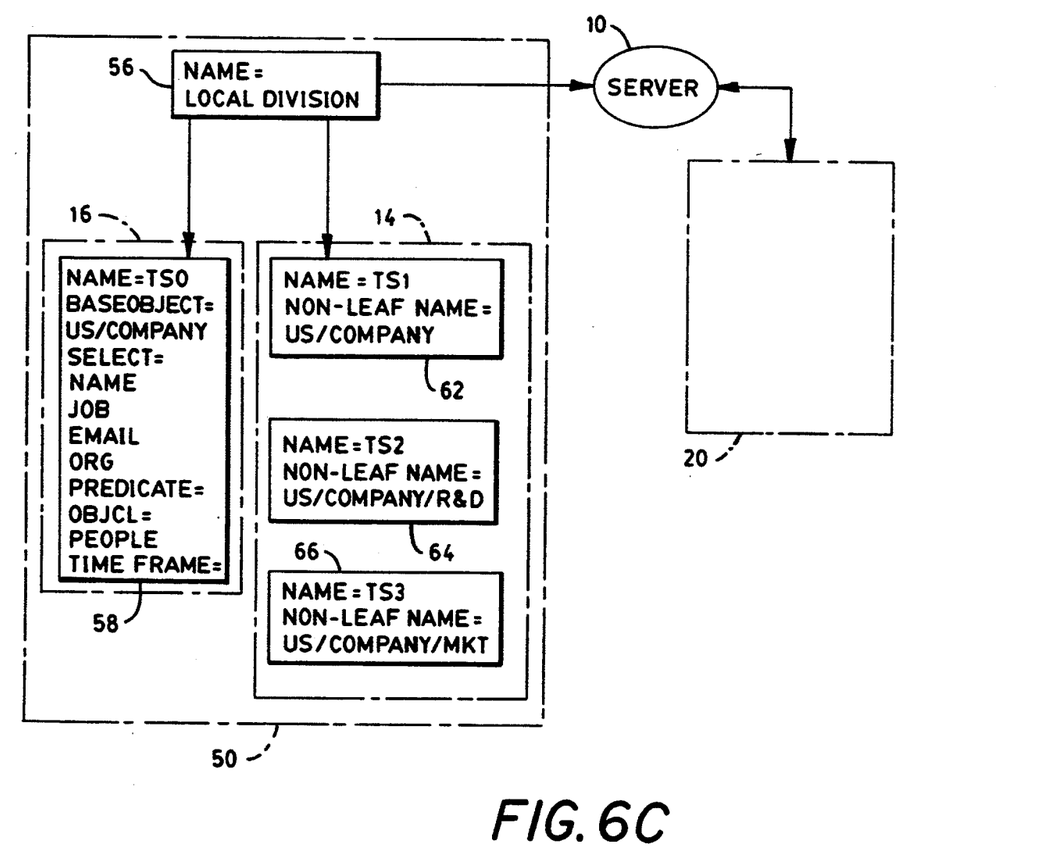

Now considering pass 2 and referring to FIG. 6C in illustration thereof wherein FIG. 6C shows local tree 50 after pass 2, there is no change in block 58 of Views Definition 16, however under control of block 22-18 of FIG. 4, Views Control 14 searches Database 20 for US/COMPANY and finds tree 51. Decision block 22-20 finds that the first entry T1 is a non-leaf entry and block 22-24 updates Views Control 14 by T1 block 62 with a highest time stamp 3. Block 22-16 determines that not all entries were processed and the process goes to block 22-18. The loop, blocks 22-18, 22-20, 22-24 and 22-26 are repeated to store T2 R & D block 64 with a highest time stamp 0 and T3 Mkt block 66 with a highest time stamp 0 in Views Control 14.

Figure 6D:
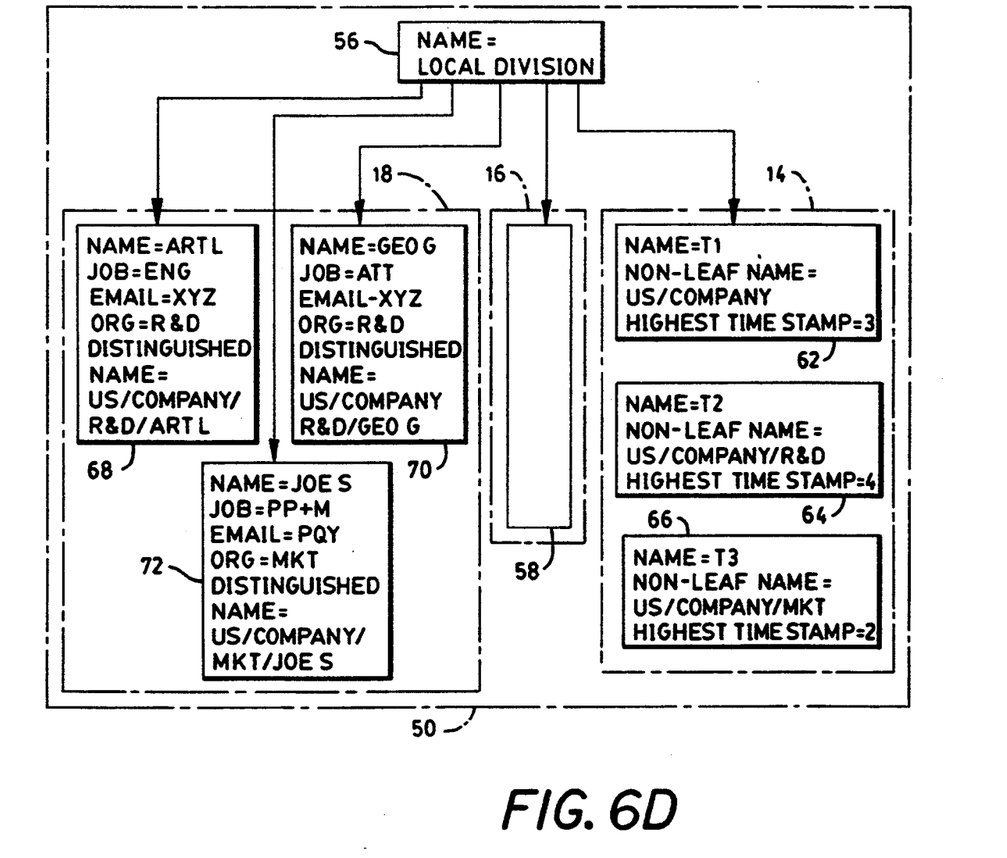

Now considering a final pass and referring to FIG. 6D in illustration thereof wherein FIG. 6D shows the result at the end of this final pass, there is no change in block 58 of Views Definition 16. Views Control 14 now includes T1 block 62 with the same time stamp 3, T2 R & D block 64 with a highest time stamp 4 and T3 Mkt block 66 with a highest time stamp 2. The time stamps are updated from blocks 59, 61 and 63 respectively and were received via blocks 22-18, 22-20, 22-24 and 22-26 as above.

Decision block 22-20 determines that the next entry is a leaf entry and branches to block 22-22 which adds the first leaf entry 68 to Views Data 18. The loop of blocks 22-22, 22-26, 22-18 and 22-20 are repeated to add leaf entries 70 and 72 to Views Data 18. Note that Blocks 68, 70 and 72 of Views Data 18 each include the selected data and its tree path in Database 20. Decision block 22-28 tests if the View List Pointer is set to the end of the list and if not, calls block 22-30 to advance the pointer to the next View Name. Otherwise the operation ends at block 22-32 as is the case in this example.

While the invention has been shown and described with reference to the preferred embodiment thereof, it will be understood by those skilled in the art that the above and other changes in form and detail may be made therein without departing from the spirit and scope of the invention.

We claim:

1. A method of formulating a search for changed entries in a global database and updating local views including the steps of
   at selected time frame intervals,
   A. building a list of all installed local view names;
   B. developing a list of desired attributes for display in each local view identified in the list of installed local view names, the attributes for each local view including a latest time stamp value for the local view wherein each latest time stamp value indicates the time of a last change to the local view and definitions of the local view;
   C. selecting a local view name from the list of installed local view names;
   D. reading from the attribute list for the selected local view name the view definitions and the latest time stamp value for the selected local view name;
   E. searching the global database using said view definitions to locate an entry corresponding to the selected local view name;
   F. when the entry corresponding to the selected local view name is a non-leaf entry, selecting a next entry;
   G. when the entry corresponding to the selected local view name is a leaf entry, comparing the time stamp value of the entry with the latest time stamp value for the selected view name from the list of attributes corresponding to the selected local view name;
   H. updating the local view corresponding to the selected local view name when the time stamp value of the entry is different from the latest time stamp value for the selected view name;
   I. determining when all entries corresponding to the selected local view name are processed;
   J. selecting a next entry corresponding to the selected local view name when all entries corresponding to the selected local view name are not processed;
   K. selecting a next local view name when all entries corresponding to the selected local view name are processed; and
   L. repeating steps C through K until all local view names in the list of all installed local view names are processed.

2. An Open Office Directory System for building and updating views stored in a local subdirectory comprises:
   global database means for storing a global distributed directory;
   a builder means for controlling when an application that builds and updates said views is to be executed;
   a view management means for periodically scanning the global database for the views stored in the local subdirectory for changes in the views stored in the local subdirectory and for storing a latest time stamp value in attributes associated with each view in the local subdirectory wherein each latest time stamp value represents a time at which the associated view stored in the local subdirectory was last changed;
   an update means coupled to said builder means for working cooperatively with the view management means to determine a change in said gloabal data base for a view stored in the local subdirectory in a current update scan by storing a time frame of a last update scan in said update means wherein the view management means is responsive to the stored time frame of the last update scan for comparing the latest time stamp values of the views stored in the gloabal database for the views stored in the local subdirectory with the stored time frame of the last update scan and determining when a change in a view stored in the local subdirectory occurred subsequent to the last update scan;
   a definition means coupled to said update means and to global database means for providing selection criteria and predicates from the attributes associated with views stored in the local subdirectory for each view stored for which a change is determined in said current update scan to have occurred subsequent to the last update scan for reading the selected attributes from entries stored in said global database means for which a change has occurred subsequent to the last update scan; and
   an entry means coupled to said global database means for storing the local entries which are received from said global database means in the local subdirectory, thereby updating the views stored in the local subdirectory.

* * * * *